US010893306B2

(12) United States Patent
Ericson et al.

(10) Patent No.: US 10,893,306 B2
(45) Date of Patent: Jan. 12, 2021

(54) DIGITAL ENCRYPTION OF TOKENS WITHIN VIDEOS

(71) Applicant: PAYPAL, INC., San Jose, CA (US)

(72) Inventors: Braden Christopher Ericson, Santa Clara, CA (US); Sam Pourcyrous, Santa Clara, CA (US); Fun-Chen Jou, San Francisco, CA (US); Kaili An, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 130 days.

(21) Appl. No.: 15/855,992

(22) Filed: Dec. 27, 2017

(65) Prior Publication Data

US 2018/0352266 A1 Dec. 6, 2018

Related U.S. Application Data

(63) Continuation-in-part of application No. 15/721,437, filed on Sep. 29, 2017, which is a continuation-in-part of application No. 15/609,941, filed on May 31, 2017.

(51) Int. Cl.
*G06F 21/00* (2013.01)
*H04N 21/2347* (2011.01)
(Continued)

(52) U.S. Cl.
CPC ....... *H04N 21/2347* (2013.01); *H04L 9/0825* (2013.01); *H04L 9/3213* (2013.01); *H04L 9/3226* (2013.01); *H04N 21/2351* (2013.01); *H04N 21/26606* (2013.01); *H04N 21/26613* (2013.01); *H04N 21/44055* (2013.01); *H04N 21/47815* (2013.01); *H04N 21/835* (2013.01);
(Continued)

(58) Field of Classification Search
CPC ............ G06Q 30/0225; G06Q 30/0235; H04L 9/0822; H04L 63/0236; H04L 63/061; H04L 63/0807
USPC ......................................................... 713/171
See application file for complete search history.

(56) References Cited

U.S. PATENT DOCUMENTS 7,150,028 B1 * 12/2006 Ranta ..................... H04N 7/085
725/23
7,499,551 B1 3/2009 Mire
(Continued)

OTHER PUBLICATIONS

Mark Buer; Integrated Security for Digital Video Broadcast; IEEE Transactions on Consumer Electronics, vol. 42, No. 3, August 1996; p. 500-503 (Year: 1996).*

(Continued)

*Primary Examiner* — Monjur Rahim
(74) *Attorney, Agent, or Firm* — Haynes and Boone, LLP

(57) ABSTRACT

Embedding of digital tokens within a digital video can occur cryptographically using a public key in some embodiments. The digital video may be altered in a variety of ways so that the video itself contains an integrated token that can represent various quantities. Audiovisual data can be altered to contain both a token and a perceptible user auditory or visual cue as to the presence of the encrypted digital token. A video with an embedded digital token may be sent to users on the Internet. A video recipient may be able to view the video and also take additional action or gain additional functionality from the digital token embedded in the video. Tokens can be embedded by altering video metadata so that the perceptible video content itself is not changed in some embodiments.

20 Claims, 8 Drawing Sheets

(51) Int. Cl.
| | |
|---|---|
| *H04N 21/266* | (2011.01) |
| *H04N 21/235* | (2011.01) |
| *H04L 9/32* | (2006.01) |
| *H04N 21/84* | (2011.01) |
| *H04L 9/08* | (2006.01) |
| *H04N 21/835* | (2011.01) |
| *H04N 21/478* | (2011.01) |
| *H04N 21/4405* | (2011.01) |

(52) U.S. Cl.
CPC ......... *H04N 21/84* (2013.01); *H04L 2209/56* (2013.01)

(56) References Cited

U.S. PATENT DOCUMENTS

| | | | |
|---|---|---|---|
| 7,843,495 B2 | 11/2010 | Aas et al. | |
| 8,543,823 B2 | 9/2013 | Carr et al. | |
| 2001/0037467 A1 | 11/2001 | O'Toole et al. | |
| 2002/0116271 A1 | 8/2002 | Mankoff | |
| 2002/0169892 A1* | 11/2002 | Miyaoku | G06F 16/955 709/246 |
| 2002/0178060 A1 | 11/2002 | Sheehan | |
| 2003/0014363 A1* | 1/2003 | Sethi | G06Q 20/06 705/44 |
| 2003/0159046 A1 | 8/2003 | Choi et al. | |
| 2003/0163787 A1* | 8/2003 | Hay | G06Q 20/367 715/248 |
| 2003/0200162 A1 | 10/2003 | Challener | |
| 2005/0100188 A1 | 5/2005 | Rhoads | |
| 2005/0169496 A1 | 8/2005 | Perry | |
| 2006/0044599 A1 | 3/2006 | Lipowitz et al. | |
| 2006/0061088 A1 | 3/2006 | Harrington et al. | |
| 2006/0126890 A1 | 6/2006 | Shi et al. | |
| 2007/0071280 A1 | 3/2007 | Fridrich et al. | |
| 2007/0278289 A1 | 12/2007 | Kunieda et al. | |
| 2008/0205780 A1 | 8/2008 | Fridrich et al. | |
| 2008/0262928 A1* | 10/2008 | Michaelis | G06Q 30/02 705/14.26 |
| 2009/0010483 A1 | 1/2009 | Au et al. | |
| 2009/0158316 A1* | 6/2009 | Kokernak | G06Q 30/02 725/32 |
| 2009/0164323 A1 | 6/2009 | Byrne | |
| 2009/0187764 A1 | 7/2009 | Astakhov et al. | |
| 2009/0194591 A1 | 8/2009 | Gobburu et al. | |
| 2009/0324061 A1* | 12/2009 | Odgers | G06T 1/005 382/162 |
| 2009/0327151 A1 | 12/2009 | Carlson | |
| 2010/0067736 A1 | 3/2010 | Khara | |
| 2010/0076834 A1 | 3/2010 | Sugaya et al. | |
| 2010/0121766 A1* | 5/2010 | Sugaya | G06Q 30/02 705/50 |
| 2010/0185504 A1* | 7/2010 | Rajan | G06Q 30/02 705/14.13 |
| 2011/0004525 A2 | 1/2011 | Byrne | |
| 2011/0016014 A1 | 1/2011 | Tonnison et al. | |
| 2011/0063685 A1 | 3/2011 | Suzuki | |
| 2011/0106372 A1 | 5/2011 | Walwer | |
| 2011/0201314 A1* | 8/2011 | Marsico | H04L 51/063 455/412.1 |
| 2011/0208575 A1 | 8/2011 | Bansal et al. | |
| 2011/0313833 A1 | 12/2011 | Graepel et al. | |
| 2012/0016726 A1* | 1/2012 | Mosites | G06Q 20/387 705/14.12 |
| 2012/0022924 A1* | 1/2012 | Runnels | G06F 3/011 705/14.4 |
| 2012/0029998 A1 | 2/2012 | Aversano et al. | |
| 2012/0095822 A1 | 4/2012 | Chiocchi | |
| 2012/0150592 A1 | 6/2012 | Govrik et al. | |
| 2012/0226616 A1* | 9/2012 | Amar | H04L 9/0643 705/50 |
| 2012/0303429 A1 | 11/2012 | Nolledo et al. | |
| 2013/0073366 A1 | 3/2013 | Heath | |
| 2013/0085835 A1 | 4/2013 | Horowitz | |
| 2013/0088616 A1 | 4/2013 | Ingrassia, Jr. | |
| 2013/0262579 A1 | 10/2013 | Chandler | |
| 2013/0282455 A1 | 10/2013 | Houseworth et al. | |
| 2013/0325619 A1 | 12/2013 | Lile | |
| 2013/0336525 A1 | 12/2013 | Kurtz et al. | |
| 2013/0339167 A1 | 12/2013 | Taylor et al. | |
| 2014/0006116 A1* | 1/2014 | Ren | G06Q 30/0207 705/14.3 |
| 2014/0046785 A1 | 2/2014 | Jenkins | |
| 2014/0089178 A1 | 3/2014 | Lee et al. | |
| 2014/0156529 A1 | 6/2014 | Pinault | |
| 2014/0303991 A1 | 10/2014 | Frank | |
| 2015/0006390 A1 | 1/2015 | Aissi et al. | |
| 2015/0019441 A1 | 1/2015 | Brown et al. | |
| 2015/0026072 A1* | 1/2015 | Zhou | H04M 1/72522 705/71 |
| 2015/0032627 A1* | 1/2015 | Dill | G06Q 20/385 705/44 |
| 2015/0092233 A1 | 4/2015 | Park et al. | |
| 2015/0193805 A1* | 7/2015 | Filipiak | G06Q 30/0226 715/202 |
| 2015/0199689 A1* | 7/2015 | Kumnick | G06Q 20/3674 705/67 |
| 2015/0227922 A1 | 8/2015 | Filer | |
| 2015/0310478 A1 | 10/2015 | Bakker | |
| 2016/0019538 A1* | 1/2016 | Arif | G06Q 20/322 705/44 |
| 2016/0072800 A1* | 3/2016 | Soon-Shiong | H04L 63/0861 726/7 |
| 2016/0086221 A1 | 3/2016 | Weinblatt | |
| 2016/0132868 A1 | 5/2016 | Butcher et al. | |
| 2016/0132931 A1 | 5/2016 | Levinson | |
| 2016/0188893 A1 | 6/2016 | Ghafourifar | |
| 2017/0214522 A1* | 7/2017 | Code | H04L 9/3247 |

OTHER PUBLICATIONS

Hui Gao; A Survey of Incentive Mechanisms; for Participatory Sensing; IEEE Communication Surveys & Tutorials, vol. 17, No. 2, Second Quarter 2015. p. 918-943 (Year: 2015).
Unknown "Adding coupon codes to your w ebsite the how and the w hy?" [Online] Ecommerce Guide [retrieved on Sep. 26, 2017]. Retrieved from the Internet: <URL: https://ecommerceguide.com/guides/coupons/>, Jan. 17, 2016.
Trupti Pathrabe, "A Novel Approach of Embedded System for Indian Paper Currency Recognition," International Journal of Computer Trends and Technology, May to Jun. 2011, pp. 152-156.
Margaret Rhodes, "A Concept Gadget Gives Digital Currency That Real Money Feel," Wired, Sep. 22, 2016 from hllps://w w w .wired.com/2016/09/concept-gadget-gives-digital-currency-real-money-feel/.
Chiou-Ting Hsu, et al., "Hidden Digital Watermarks in Images " IEEE Transactions on Image Processing, Jan. 1999, pp. 58-68, vol. 8, No. 1, Jan. 1999.
Mathew Franklin, "Secure and Efficient Off-Line Digital Money," Jan. 1999, pp. 1-20.
Sharon D. Wilson, et al., "Metadata in Digital Photos—Should You Care?" Slaw , Sep. 26, 2013 from http://www .slaw. ca/2013/09/26/metadata-in-digital-photos-should-you-care/.
Lee Lofland, "Josh Moulin: What Information is in Your Digital Images?" The Graveyard Shill, Oct. 3, 2012 from http:/w w w .leelofland.com/w ordpress/josh-moulin-w hat-information-is-in-your-digital-images/.

* cited by examiner

Digital
Image
210

Image File
260

DIGITAL ENCRYPTION OF TOKENS WITHIN VIDEOS

RELATED APPLICATIONS

This application is a continuation-in-part of, and claims the benefits of U.S. patent application Ser. No. 15/721,437, filed Sep. 29, 2017, entitled "Encryption of Digital Incentive Tokens Within Images", which is a continuation-in-part of U.S. patent application Ser. No. 15/609,941, filed May 31, 2017, titled "Digital Encryption of Tokens Within Images," the contents of all of which are herein incorporated by reference in their entirety.

TECHNICAL FIELD

This disclosure includes techniques relating to the embedding of digital tokens within digital videos.

BACKGROUND

Digital files typically use a certain amount of data to store a video, which may be in a variety of different formats (e.g. MPEG-4, Audio Video Interleave (AVI), QuickTime™ (MOV), etc.). Such videos are a common method of communicating on the Internet. Users may send videos to one another via email or other mechanisms.

Typically, however, when an Internet views a video, additional information is not conveyed in the file. The recipient of the video is able to view it, but generally only is able to appreciate visual and audio content shown to the recipient via a digital video player.

DETAILED DESCRIPTION

Figure 1:
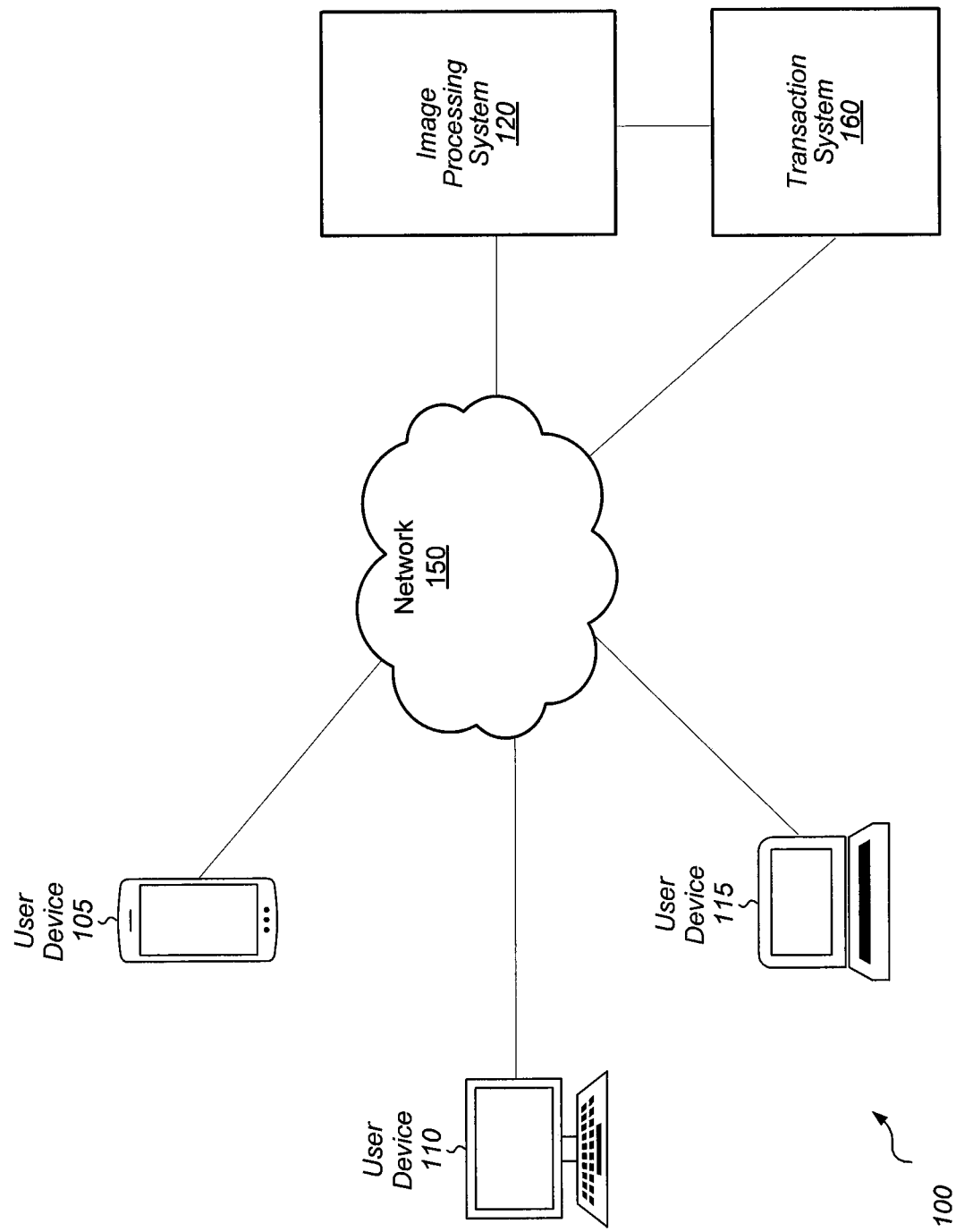
FIG. 1 illustrates a block diagram of a system that includes users devices, an image processing system, a transaction system, and a network, according to some embodiments.

The present specification allows for the embedding of digital tokens within a digital video. These tokens may be cryptographically obscured using an encryption key, such as a public key of a public/private key pair. An encrypted digital token may therefore be embedded within a digital video, in various embodiments, and the token may include a variety of encrypted information.

By embedding a digital token within a video, the video may be sent to one or more users on the Internet along with the token. A recipient of the video may not only be able to view the video, but can take additional action or gain additional functionality from the digital token that is embedded within the video.

Tokens can be embedded by altering video metadata in some embodiments. Metadata may be altered so that the video itself is not changed, but associated data with the video is changed to reflect a created token. In other embodiments, video and/or audio data of the video itself can be modified to reflect a created token. This may be advantageous in some cases where a video may be shared on a different platform that may strip some or all metadata from the video—by embedding the token within the video/audio data itself, the token cannot (or cannot easily) be stripped. In yet further embodiments, a token can be embedded in a video such that the resulting video is noticeably visually altered. For example, a filter could be put on all or a portion of the video (black/white, sharpening, softening, color-altering, or any of a number of visual image filters). A watermark (e.g. a particular logo) can also be put on all or a portion of a video.

Digital currency may also be represented as a balance within an account. For example, a PayPal™ user may have an account associated with an email address that has a stored balance of funds. These funds can be transferred to another account based on a user making a transfer request. Thus, a user might request a digital payment be made to a friend or family member, or to a merchant selling a good or service. Upon completion of such a transaction, the user's account balance is reduced, as the digital funds have been spent.

Movement of digital currency has generally not involved using a digital video as a mechanism in making a transfer in the past. However, according to the present techniques, a digital token representing an amount of digital currency may be embedded within a digital video. The video, and the associated digital token, can be used to transfer currency (or other values) between users in a unique way not previously available, including a variety of associated different features and architectures for this transfer. This may be particularly useful to users in social media environments, where a user can share a video with one or more users who can then redeem the embedded digital token for a reward. A user can send a video via a social media platform to one or more other users, who can then use the video itself to generate value on an electronic payment transfer platform like Venmo™ or PayPal™, or any similar provider. Even if a social media platform strips metadata from a video, in some instances, the video itself can still retain the digital token. In some cases, social media platforms may also be aware that a digital token (e.g. representing currency) is present in a file, and decline to strip the digital token data (e.g. from the metadata) so that users of the social media platform may benefit from the use of the digital token.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Turning to FIG. 1, a block diagram of a system 100 is shown. In this diagram, system 100 includes user device 105, 110, 115, an image processing system 120, a transaction system 160, and a network 150. As discussed below, devices such as user device 105 may interact with image processing system 120, other user devices, and/or transaction system 160 to accomplish embedding a digital token within an image and related techniques, in various embodiments.

Note that while various techniques are discussed herein with regard to images, these techniques are also applicable to videos in various embodiments. Any structures and methods described below can be used and/or adapted for use with video. Video-related embodiments will be discussed in more explicit detail below beginning with FIG. 7. Similarly, techniques and structures described relative to video may also be used and/or adapted for use with image.

User devices 105, 110, and 115 may be any type of computing system. Thus, these devices can be a smartphone, laptop computer, desktop computer, tablet computer, etc. Some user devices may have a digital camera integrated into them, such as a smartphone for example.

Image processing system 120 may comprise one or more computing devices each having a processor and a memory, as may transaction system 160. In various embodiments, image processing system 120 can take various operations related to embedding digital tokens within digital images. Transaction system 160 may correspond to an electronic payment service such as provided by PayPal™. Thus, transaction system 160 may have a variety of associated user accounts allowing users to make payments electronically and to receive payments electronically. A user account may have a variety of associated funding mechanisms (e.g. a linked bank account, a credit card, etc.) and may also maintain a currency balance in the electronic payment account. A number of possible different funding sources can be used to provide a source of funds as part of creating a digital token for embedding in an image, where the digital token represents an amount of money. User devices 105, 110, and 115 can be used to access electronic payment accounts such as those provided by PayPal™.

Figure 2A:
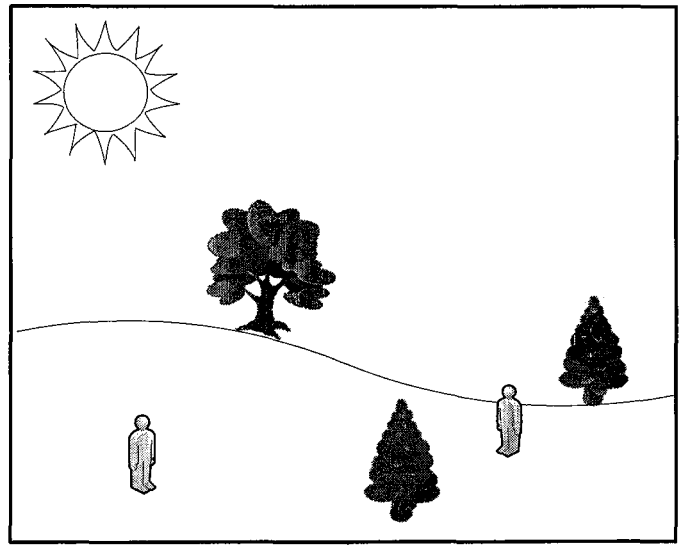
FIGS. 2A and 2B illustrate block diagram of a digital image and a logical representation of an image file, according to some embodiments.

Turning to FIG. 2A, a block diagram 200 is shown of one embodiment of a digital image 210. Digital image 210 depicts a particular scene, and may be generated by a user of a smartphone or digital camera. Images such as digital image 210 may also be scanned copies of an analog image (e.g. an image printed from film, a scan of a drawing, etc.). Digital image 210 may also be generated wholly or partially from scratch by a user, with an editing program such as Adobe™ Photoshop. Digital image 210 can also be a screen capture from a video. In other words, digital image 210 can depict anything in various embodiments.

Figure 2B:
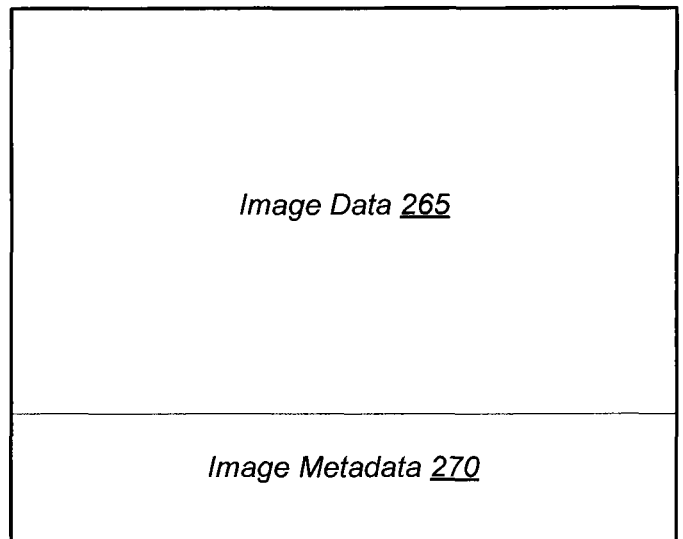

Turning to FIG. 2B, a block diagram 250 is shown of one embodiment of a logical representation of an image file 260. Image file 260 may correspond to any of a number of different digital image formats, such as JPEG, GIF, TIFF, PNG, BMP, RAW, PDF, etc.

As depicted, image file 260 includes a section with image data 265 and a section with image metadata 270. Image data 265 includes various information about the actual visual content of an image. Thus, image data 265 may include information usable to determine red, green, and blue (RGB) color values for each pixel within a digital image, for example.

Image metadata 270 can include various image-related data that is not necessarily needed to be able to render a digital image on a display or printer. Image metadata 270 may contain GPS coordinates or other location information corresponding to a place associated with an image (e.g. a real world location where a picture was taken). Image metadata 270 may include a date and/or time that a picture was taken. Image metadata 270 can also include other data in various embodiments—for example, identities of people in the image, as may correspond to social media websites such as Facebook™.

Note that while depicted to be logically separate in FIG. 2B, image data 265 and image metadata 270 could be co-mingled within a file in various embodiments. That is, image data 265 and image metadata 270 need not be separate and contiguous in storage space—this data can be organized in any suitable way that is desired and/or that conforms to a digital image format. In some embodiments, image metadata 270 may even be stored in a separate file or other data construct from image data 265.

Figure 3:
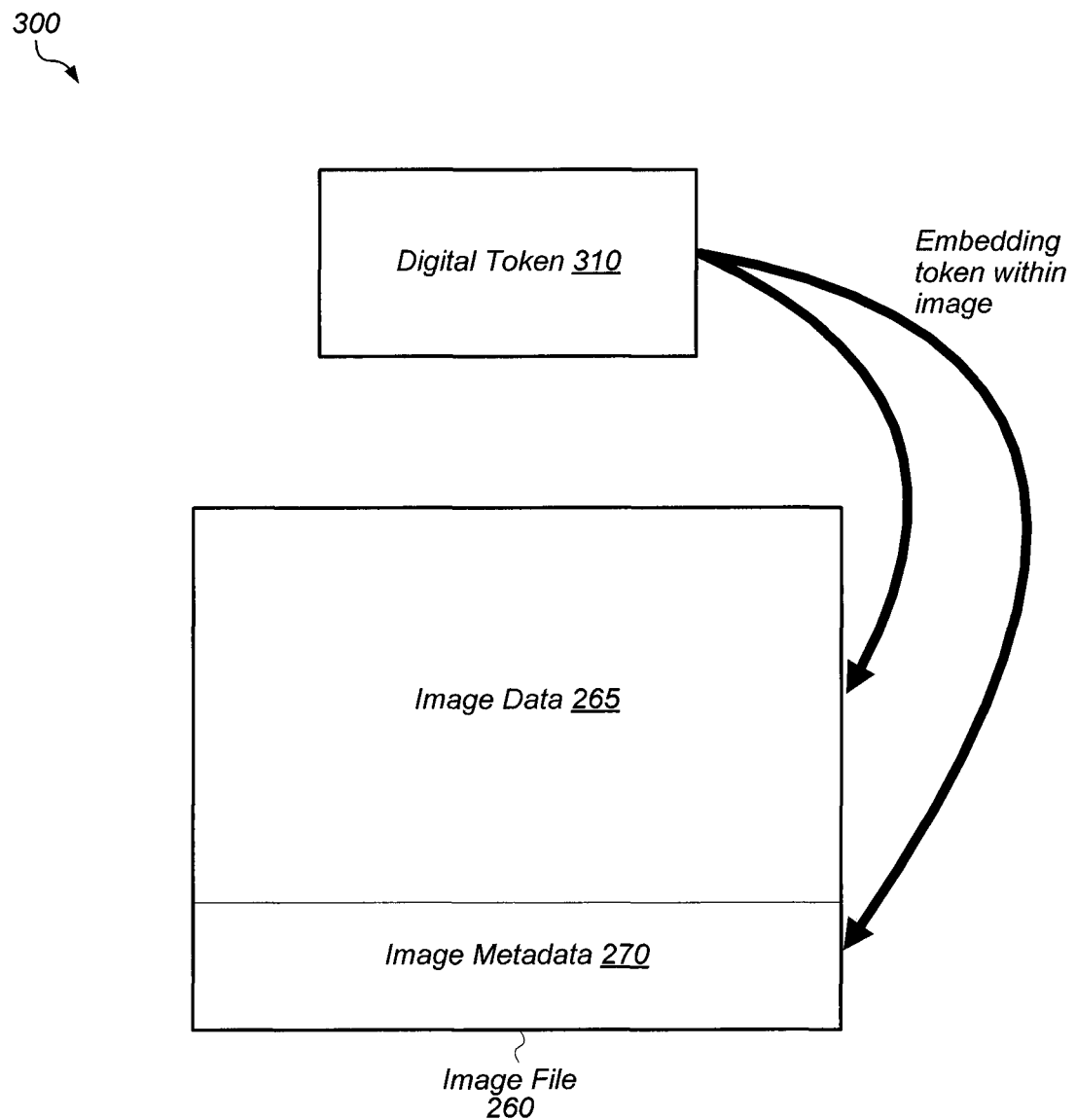
FIG. 3 illustrates an information flow diagram relating to an illustration of one embodiment of embedding a digital token within an image file, according to some embodiments.

Turning now to FIG. 3, a block diagram 300 is shown illustrating one embodiment of embedding a digital token 310 within image file 260. In various embodiments, digital token 320 includes information identifying an amount of digital currency. This information may take a variety of formats, but in some embodiments, includes an identifier unique to image processing system 120 and/or transaction system 160.

When digital token 320 is embedded within image file 260, the digital token may be stored partly or wholly within image data (e.g. using stenographic techniques) or partly or wholly stored within metadata associated with an image. These aspects are discussed further below.

Figure 4:
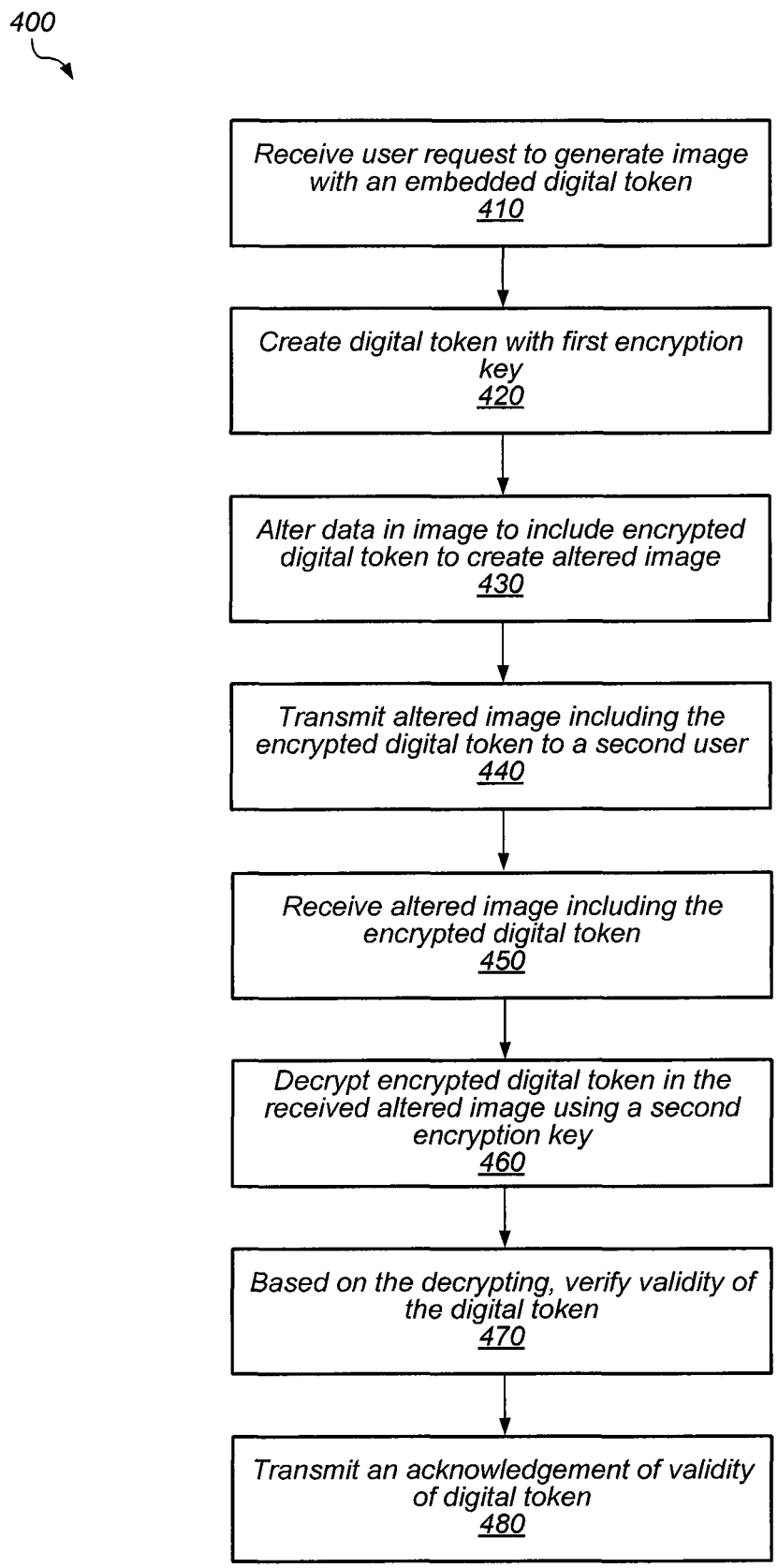
FIG. 4 illustrates a flow diagram of a method that relates to generating an image with an embedded digital token, according to some embodiments.

Turning now to FIG. 4, a flow diagram is shown illustrating one embodiment of a method 400 that relates to generating an image with an embedded digital token.

Operations described relative to FIG. 4 may be performed, in various embodiments, by any suitable computer system and/or combination of computer systems, including image processing system 120 and/or transaction system 160. For convenience and ease of explanation, however, operations described below will simply be discussed relative to image processing system 120. Further, various elements of operations discussed below may be modified, omitted, and/or used in a different manner or different order than that shown.

In operation 410, in one embodiment, image processing system 120 receives a user request from a first user of a first computer system to generate an image with an embedded digital token. This request may be received from one of user devices 105, 110, or 115, for example.

The embedded digital token is a payment token, in various embodiments, corresponding to a desire of a user to have an image itself be able to serve as a representation of money. A user can use an application on a smartphone, such as the PayPal™ app or the Venmo™ app (or another app) to make the request to generate an image with an embedded digital token (e.g., a payment token). Such requests can of course originate from another computing device, such as a desktop or laptop computer, a wearable computing device, etc. A user may therefore take one or more actions on a computing device to cause the request to be sent to image processing server 120.

In some embodiments, a user can select the image in which he or she wishes to embed a digital token. Thus, a user of a smartphone may be able to browse through a library of captured images on the phone to select an image. In other embodiments, an app on a smartphone (or other device) may actually prompt the user to take a new photo by causing a camera application on the smartphone to be opened up. Accordingly, in one embodiment, the request in operation 410 is received from an application running on a mobile phone device. An image uploaded by the user may also corresponds to an image originally created using a camera of a mobile phone device (or may be an image otherwise acquired by the user, on any device, in various embodiments).

In operation 420, image processing system 120 creates a digital token encrypted with a first encryption key. This digital token may include information identifying an amount of digital currency in various embodiments, and operation 420 may be performed responsive to a user request (e.g., operation 420 can be performed in response to a user of a smartphone requesting to create an image with money embedded in the image).

The information identifying the amount of digital currency, in some embodiments, can include a unique identifier created by image processing system 120. Image processing system 120 may maintain information for a large number of different images with embedded digital tokens, each of which may be redeemable for an amount of digital currency. In order to be able to track the digital tokens (and to know how much money is associated with a particular token), image processing system 120 therefore can use unique IDs for each token to access information associated with that token (e.g., monetary amount, creator of token, etc.). Note that various attribute information/metadata may be associated with a digital token that is embedded in an image. This information can be included at the time the digital token is created, or can be modified at a later time in some embodiments.

The encrypting performed in operation 420 may be done using a public-private key pair. In one embodiment, for example, operation 420 may include image processing system 120 encrypting a digital token with the public key in a public-private key pair (preventing the encrypted digital token from being decrypted by someone who does not have the corresponding private key, which may be kept secret by image processing system 120). In another embodiment, operation 420 may also include using the private key of a public-private key pair to add signature information into an image. For example, a private key for Venmo™ could be used to encrypt information saying "This image includes $5.00 in digital currency redeemable by Venmo™!" (or similar). Anyone with Venmo's public key could decrypt the signature information and would then know that Venmo legitimately authorized placement of a currency-bearing digital token within an image, in this example.

Operation 430, in some embodiments, includes altering data in an image to include an encrypted digital token in order to create an altered image that includes the encrypted digital token. In other words, an encrypted digital token may be stored within an altered image. Operation 430 includes altering image metadata 270 and/or image data 265 in various embodiments. Altering data in an image to include an encrypted digital token (e.g. representing an amount of digital currency) therefore can be performed in different manners. In some cases, altering image metadata 270 may result in a completely unchanged digital image. In other cases, altering image data 265 can result in a changed digital image—however, these changes may be very slight such that a user's visual perception of the altered digital image is similar or the same to their perception of the un-altered image prior to embedding of the encrypted digital token. Altering data in the image therefore can include altering metadata and/or altering image data.

In operation 440, in one embodiment, image processing system 120 transmits an altered image (e.g. from operation 430) that includes an encrypted digital token to a second user. This may include transmitting an altered image that represents an amount of digital currency, for example, to a user different from the first user. This could be for a gift, for a payment, or any other monetary transfer that the user wishes to complete via an image. In one embodiment, however, the altered image could be transmitted to the same user (e.g. the user receives the altered image with the encrypted digital token from image processing system 120, and can then do something with it such as email it, post to social media, save for later usage, etc.).

The transmitting in operation 440 can therefore include a transmission to a device and/or a user account. Transmitting can be accomplished by an upload to a social media platform (e.g., a direct message on TWITTER™, an image posted on INSTAGRAM™ or FACEBOOK™, etc.). Transmitting in operation 440 can include sending an email to a user email address, or a multimedia text message directed to a phone number (e.g. an MMS message) which may ultimately be received by a smartphone, for example, in various embodiments. An image with an encrypted digital token, once initially created and/or transmitted, can also be transferred without restriction in various embodiments (e.g. a first user can send the image to a different second user, who can then send the image on to anyone of their choosing).

In one embodiment, however, operation 440 includes using a closed system to transmit an altered image with an embedded digital token. A user of VENMO™ (or another platform) for example, might be allowed to transmit an altered image only to other VENMO users, or only to users of one or more other particular platforms. E.g., image transmission may be restricted in some instances. For example, a client platform application might allow a user to view a photo and transmit the photo, but only within the platform application. If the user tried to capture the image with a screen shot, in one embodiment, the embedded digital token data would not carry forward with the captured image. Thus a user can be prevented from unrestricted transmission in some cases.

In operation 450, in one embodiment, image processing system 420 receives the altered image including an encrypted digital token. The altered image may be received from a second user (e.g. a user to which the image was originally transmitted) or any other user, in various embodiments. Thus, an image created with an embedded digital token representing an amount of money can be sent to one or more various users, and then received again (back) at image processing system 120. After this later receipt, image processing system 120 can determine if there is a valid token can should be redeemed for currency, as further discussed below.

Similarly to operation 440, image processing system 120 can receive in image in a variety of ways in operation 450. A client application (e.g. a VENMO or VENMO-affiliated application running on a smartphone) could send the image, for example, responsive to a user action. A user could drag and drop or otherwise select the image to cause the client application to transmit the image back (e.g. for verification).

Operation 460, in one embodiment, includes decrypting, by image processing system 120, an encrypted digital token in an altered image. As noted above, the altered image can be transmitted to image processing system 120 by any user in possession of the altered image, in various embodiments, for decryption. Operation 460 therefore can include using a second encryption key (such as a private encryption key in a public-private key pair) corresponding to a first encryption key (e.g. the public key) in order to perform decryption. After decryption, the embedded digital token can then be checked for validity and/or redeemed for currency, for example.

In some instances, operation 460 may require that image processing system 120 be able to first extract the data from an altered image that should correspond to the embedded digital token. In other words, image processing system 120 may need to know which bits of an image should be run through a decryption operation. This can be accomplished in some embodiments as long as image processing system 120 knows what algorithm(s) and/or data were used to alter the image originally. E.g., image processing system may know to look at certain pixel values to extract one or more bits of information, or which portion(s) of image metadata contain embedded digital token data. Image processing system 210 may have to reassemble an embedded digital token data prior to decryption (e.g. by appending different bits of extracted information and/or taking other operations, such as using bitwise arithmetic like addition, subtraction, or multiplication on certain bits of extracted information).

In operation 470, in one embodiment, image processing system 120 verifies the validity of a decrypted digital token (e.g. from operation 460). Verifying validity can include extracting a unique identifier from the decrypted digital token, and then querying a database with the unique identifier. The database may include a list of all digital tokens created by image processing system 120, and a record for the unique identifier can be referenced in the database. This record can contain an indicator of whether or not a given token is valid or invalid, for example. The token may be marked invalid, for example, if it has been redeemed by a user and no longer has any monetary value. If there is no record for a unique token identifier, in some embodiments, this may indicate that the corresponding token is not currently valid. (Note that in some cases, it is possible that a decryption operation on the token, e.g. in operation 460, can fail on its own, which also indicates that an image has no valid encrypted digital token in various embodiments. This could occur if an image with a digital token became corrupted due to data errors or user interference, for example.)

After a digital token from an image is verified, a user who sent the digital token to image processing system 120 for verification may be credited with an amount of currency corresponding to the digital token. Thus, if a user receives an image with a $50 encrypted digital token, the user may receive a $50 credit for an associated account (e.g. a Venmo or PayPal account) upon verification of the digital token and its redemption.

In operation 480, in one embodiment, image processing system 120 transmits an acknowledgement of the validity of a digital token. In various embodiments, operation 480 is performed responsive to verifying the validity of a digital token (e.g. operation 470).

Thus, operation 480 may relate to sending an email, text message, or other communication that informs a user that an image (e.g. that has been uploaded back to image processing system 120) contains a valid digital token. This acknowledgement may include information about an amount of currency, associated with the digital token, that is being credited to a redeeming user. Thus, for example, operation 480 might include sending a message that states "Congratulations! You have redeemed your selected image from (Sender) in the amount of $50!", or similar. As will be appreciated, a user can be informed of the successful validation of a digital token embedded in an image in a variety of ways.

In some embodiments, a user redeeming an image may not be automatically credited with an amount of currency upon successful validation of a digital token embedded in an image. A user may, in some instances, be presented with options for redeeming the currency amount for the digital token. For example, a user may be given the option to redeem the currency amount for an alternative award, such as frequent flyer miles, credit card points, a gift card to a merchant, etc. In some cases, the alternative award may have a bonus factor applied, e.g., a $50 currency amount might be redeemed for a $55 gift card for a merchant (a 10% bonus), or a greater amount of another type of (e.g. more than the normal cash equivalent for frequent flyer miles, etc.).

Thus, as described above, the method of FIG. 4 may allow a user to create an altered image with an encrypted digital token representing an amount of currency, in various embodiments, and then send the altered image to another user who can then transmit the altered image back to image processing server 120 for verification and redemption. Additional aspects of these and related techniques are described below.

Geo-Location Data & Additional Aspects

Geo-location data can be used in a variety of ways with digital token-containing images in various embodiments. Images, even prior to being altered to include an embedded digital token, may have geo-location data associated with them. For example, a smartphone that has a Global Positioning System (GPS) device may tag an image with the GPS coordinates of where the image was captured by the smartphone's camera. Other methods can also be used to associate an image with a geographic location (e.g. the user may manually add location data for the image via software). Geo-location data can be saved as metadata within an image file itself or in an associated data structure (e.g. a separate database or separate file), in various embodiments.

Geo-location data for an image can be used to determine whether a user is allowed to redeem an encrypted digital token for currency (or another award), in some embodiments. For example, a user may have to position themselves in a geographic location of where an image was taken in order to redeem a digital token embedded in the image (or a user may have to position themselves in another geographic location as specified).

Thus, in one embodiment of method 400, image processing system 120 removes geo-location metadata from an image, and determines whether to allow a user to redeem an digital token embedded in the image based on whether a device of the user is within a certain proximity to a location where the image was captured. By removing location data from an image with an embedded digital token, a recipient of the image may not have access to information identifying where the image was taken. Instead, the user may have to know where the image was taken, and navigate in the real world to that location in order to redeem the digital token. This can accomplish a variety of goals—for example, a first user who creates the altered image containing a digital token may want to allow a recipient to only redeem the image when the recipient is in a particular place. An aunt giving her niece $100 to spent on a trip to London, for example, might only allow the niece to redeem a digital token when the niece is located on the Crown Bridge crossing the river Thames. A merchant giving away a coupon, store credit, and/or cash might only allow users to redeem a digital token if the user is physically present within one of the merchant's stores. (Thus, in some embodiments, geo-fencing a redemption zone for a digital token embedded in an image can include specifying multiple locations or location types at which the digital token can be redeemed.)

Additionally, note that a user can specify geo-fencing location data for redemption of a digital token in a variety of ways. In some embodiments, a user can take an image in a real world location, and tie redemption of the image to a physical presence (e.g. as detected by a GPS device) in that real world location. In another embodiment, a user can assign one or more arbitrary physical locations for redemption of an image, or one or more arbitrary categories of location. For example, a user could take a picture of a tree, and specify that a digital token in the image could be redeemed by anyone who is located in the boundaries of a national or state park. A user can even acquire a picture of anything (from an outside source, or from his own camera) and allow a digital token for that image to be redeemed in any arbitrary location specified by the user. In some embodiments, a map overlay may be displayed to the user, who can then specify one or more geo-fenced locations on the map (e.g. by dropping a pin at a landmark or location, by drawing a boundary with a cursor around one or more physical locations, etc.). The user can also be provided with category templates allowing specification of where a digital token can be redeemed (e.g. any HOME DEPOT™ store, any beach, any mass transit station like a train or bus station, any airport, one or more foreign countries, etc.). The previous list is not exhaustive; many different categories are contemplated in various embodiments.

In another aspect, the way in which pixel image data is altered to include a digital token may be based on one or more algorithms that use different underlying situational data. For example, a time of day can be used as a basis for determining which particular data in an image is to be altered. This may especially apply, in some embodiments, when data is being stored by altering pixel data (e.g. as opposed to altering only metadata). Image processing system 120 can use a timestamp (date and time, for example) to determine which particular pixel values might be altered. Thus, if image processing system 120 receives an image at a first date and time, the pixels [0, 20], [15, 30], and [250, 17] might be altered (among others) to store digital token data. At a different date and time, pixels [5, 10], [33, 50], and [100, 575] (among others) could be altered. Image processing system 120 may keep a record in a database of the timestamp so that when the altered image is later presented for validation and redemption, the system can know where to look to find the embedded digital token data. In various embodiments, this feature may enhance security by making it more difficult for a party other than image processing system 120 to extract a digital token. Another algorithm may similarly alter pixel data based on GPS location coordinates associated with the image (e.g. a mapping or hashing function can be used to determine which particular pixels to alter based on the input data).

Operations performed by image processing system 120 may also include debiting an amount of currency from a first user (e.g. a user creating an altered image with an embedded digital token) and crediting the amount of currency to a second user (e.g. a redeeming user who has provided the image or proof of possession of the digital token to processing system 120), in some embodiments. Thus, a user who requests creation of an altered digital image that includes a digital token (e.g. representing currency) might be debited $10 from a source of funds, and a redeeming user could be credited the $10. Source of funds could include a PayPal™ account balance, a credit card, a debit card, a bank account, a frequent flyer miles account, etc., in various embodiments. Note that in some instances, crediting and debiting operations may occur with the assistance of transaction system 160. Thus, operations performed by image processing system 120 can include debiting an electronic payment account based on altering data of a digital image to include a digital token (e.g. representing an amount of currency).

In various embodiments, currency (or other values) debited from an account can be transferred to a holding account until a time that a digital token embedded in an image is redeemed by a user. An image sender therefore may have their account immediately debited, but an image recipient may not be credited until a digital token embedded in an image is redeemed.

Digital Token Controls

In some cases, a digital token embedded in an image may have various controls associated with it. As discussed elsewhere herein, a digital token sometimes can only be redeemable within a geo-fenced area in the real world (e.g. as detected by the presence of a user's physical device through GPS or other means of detecting location).

A digital token may also have time-based controls. In some cases, a digital token might only be redeemable at certain times of day, days of the week, specified dates, etc. Digital tokens can also have expiration dates associated with them. Thus, if a recipient gets an image with a $10 embedded digital token, that token could be specified to expire within two weeks (or by a certain date, etc.). If the recipient does not redeem the token in a timely manner, currency can be reverted to the account of the sender so that the money is not "lost" if a recipient fails to take action to receive the money. (Note that in some embodiments, however, a recipient may need to do as little as viewing an image with a digital token in order for redemption to take place. For example, if a user is on a smartphone application, the user could open a message from another user where the message contains the image. The application may contain logic such that when the user views the message, it communicates with image processing server 120 (and/or another system) as needed to cause currency associated with a digital token in the image to be credited to the user. In other words, a recipient of an image with a digital token need not explicitly request credit for the money represented by the digital token, in various embodiments.

Recipients who are allowed to redeem a digital token embedded in an image can also be controlled, in some embodiments. In some instances, a user may wish to restrict an embedded digital token to certain individuals or groups so that only those individuals or groups are allowed to redeem the token for currency (or another award). Thus, when a user request to create an image with an embedded digital token is made, the user may specify one or more options restriction redemption of the digital token.

A user can specify individuals who are allowed to redeem a token by email address, by network identifier (e.g. social media user ID), phone number, or other identifying information. A user can also specific groups based on one or more characteristics. These characteristics can include email address domain, e.g., anyone with a RICE.EDU email address, a residence, e.g., anyone who has a postal mailing address in the city of San Jose, Calif., anyone who is connected on social media (e.g., a "friend" on Facebook™) or even anyone within a degree of connection (e.g., friends of friends on Facebook™, first, second, or third degree connections on LinkedIn™, etc.). Various other group-defining characteristics are possible. In some cases, information on whether a recipient is allowed to redeem a digital token can be gathered from an online service and/or website that a user is associated with (e.g., a home address associated with a PayPal™ account might be used for purposes of determining residence city, state, and country).

Computer-Readable Medium

Figure 5:
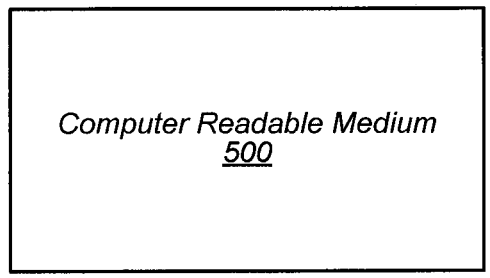
FIG. 5 is a block diagram of a computer readable medium, according to some embodiments.

Turning to FIG. 5, a block diagram of one embodiment of a computer-readable medium 500 is shown. This computer-readable medium may store instructions corresponding to the operations of FIG. 4, FIG. 9, and/or any techniques described herein. Thus, in one embodiment, instructions corresponding to image processing system 120 may be stored on computer-readable medium 500. In other embodiments, instructions corresponding to user device 105 or server 805 may be stored on computer-readable medium 500.

Further, in some embodiments, computer-readable medium 500 includes instructions executable by a computer system to cause the computer system to perform operations comprising, creating a digital token representing an amount of digital currency responsive to a request from a user to embed the amount of digital currency within a digital image, altering data of the digital image to include the digital token, and transmitting the altered digital image including the digital token. These operations relate to various aspects described above relative to the method of FIG. 4, in various embodiments. Creating a digital token, for example, may involve using an encryption key and/or creating a unique identifier for the digital token. Altering data of a digital image to include a digital token may include altering pixel data and/or metadata of the image. Transmitting the altered digital image can include sending an email, sending a notification through another application (e.g. a PayPal™ app), etc.

Additional aspects of computer-readable medium 500, and operations it-enables in various embodiments, are described below. Note that these some or all of these aspects are combinable with aspects described elsewhere in this disclosure (E.g. details described for method 400 may apply to computer-readable medium 500, and vice-versa). For brevity, with respect to FIG. 5, the term "operations" will be used to refer to operations caused by execution of instructions stored on computer-readable medium 500 in various embodiments.

In one aspect, operations include altering data of a digital image such that data is inserted into a metadata section of the digital image. Thus, a unique identifier of a digital token can be stored in metadata of an image (and may be encrypted in some instances). Altering data of a digital image to store a digital token can also include generating pixel values by changing a plurality of pixel values in the image. Thus, image processing system 120 may operate under an algorithm, which may be image specific, such that a red pixel value at [0, 20] greater than 128 on a 256 bit scale is considered a "1" while a value less than or equal to 128 is a "0"). A green pixel value for the same [0, 20] pixel might be greater than 32 to be considered a "1", and otherwise considered "0". In some instances, storing the digital token within image data may therefore include tweaking image data (for example, adjust a green pixel value from 30 on a 256 bit scale to 32, which might change its value to "1" when image processing system 120 extracts token data from the image). Accordingly, making changes to image pixel data may include changing pixel values within a particular corresponding range to avoid a significant negative impact on image quality (e.g. constraining value changes to within an absolute quantity such as 3 or 5 points on a 256 bit scale, or a percentage quantity such as 1%, 2%, 2.5%, or some other value). In some instances, there may also be a distance requirement between changed pixels (e.g. no two changed pixels should be within a certain distance of one another in the image) to also help maintain image quality.

Embedding a Digital Token without Changing Pixel Data

Note that in some embodiments, pixel data can be used to effectively store a digital token within an image even without having to alter pixel data for the image (or any data, in some instances). Consider a unique digital token identifier value of "123789". This token value can be broken down into six different values (1, 2, 3, 7, 8, and 9). For this pixel value to be effectively stored in an image, image processing system 120 would simply need to locate data within the image that corresponds to each of these six values. As there is often a large amount of pixel data associated with images, this may be fairly easy to accomplish. Image processing server 120 can scan the image file, and look for a pixel that has a value of 1 at a particular location (e.g., perhaps pixel [25, 25] has a blue color value of 1). Image processing server then makes note that for this image, the first value of the digital token identifier can be located at [25, 25] (blue pixel). This process can be repeated such that each component value of a unique digital token value can be found to already exist throughout an image—it may simply be a matter of knowing where to look. Various additional techniques can be used as well—for example, arithmetic could be performed to find the proper transformation. E.g., if the value "1" cannot be found in pixel data for an image, perhaps the value "2" can be found at [10, 5] (red pixel)—and then image processing system 120 would note that for this image, the first component value of the digital token identifier is the value achieved from subtracting one from [10, 5] (red pixel). Many different variations of arithmetic or other transforms are possible. Image processing server 120, upon receiving a digital image from a user in which to embed a digital token representing currency, could then determine (1) a unique identifier for the digital token and then (2) based on analysis of image pixel data, determine where in the image (and what transformations, if any) this unique identifier is already represented, resulting in mapping data (which can include transformation data). Mapping data could then be stored by image processing system 120 for the image in association with a unique hash value (or other key value) for that image. Upon later getting that image from a user attempting to redeem a digital token, the unique hash value could be determined, allowing a lookup into a mapping database. If an entry is found, the mapping information can then be used to determine a unique digital token identifier. Alternatively, the unique hash value alone could be considered to be the digital token identifier, and used accordingly. Thus, in some instances, it may not be necessary to modify pixel data for an image in order to effectively store a digital token within the image.

In yet another aspect, operations may comprise receiving an upload of a digital image from a user and analyzing the digital image to determine if the digital image is considered suitable for alteration to include a digital token. Different standards may be applied in various embodiments to determine if an image is considered suitable. Images that are too small or too large, for example, may be disallowed (e.g. if a user tries to upload a 50×80 image or a 4000×6000 image in which to embed a digital token, these may be rejected, in some instances). Content filters may also be applied. If analysis of an image determines that the image contains nudity, violence, profanity (either visual or textual), and/or copyrighted material, the image could also be rejected in various embodiments.

Operations may also comprise encrypting a digital token with a first encryption key associated with a maintainer of an electronic payment system, where altering data of the digital image to include the token includes altering the data to be reflective of the encrypted digital token, in one embodiment. For example, PayPal™, as a maintainer of an electronic payment system allowing transfers of money between parties, could use a public encryption key to encrypt a digital token so that no one else could easily decrypt the token unless they possessed PayPal's corresponding private encryption key.

Social Media and Image-Embedded Digital Tokens

Images with embedded tokens (e.g. images that have been altered to include data representing a digital token or images that have had data sampled and stored of a hash of the image itself, or another way to uniquely identify the image in association with a digital token) can be shared on various social media platforms in different embodiments. A user requesting creation of a digital token n for an image can receive an image that allows the requesting user to post the image on a platform such as Instagram™, FaceBook™, or any other social media service. Another user(s) on these services can redeem a posted image for currency or another reward. Other users on these services can also transmit a posted image to yet further users, particularly in some embodiments where an image can be redeemed multiple times. For example, a digital token may be multi-use, such that a first recipient could redeem it once (or possibly more than once, up to a limit) A user of a social media platform for example might be able to both redeem an image for an amount of currency, and then re-post a multi-use digital token embedded image so that other users (such as friends of friends) could also use the digital token for currency or another reward.

Thus, in various embodiments, a digital token can be created by image processing system 120 (or another system) that allows for multiple redemption. A token can be created such that it can redeemed 4×$20, for example, with only a unique user allowed to redeem it once (values can be adjusted, of course). When a token is created, the creating user can specify other users and/or groups of users who are allowed to redeem—thus, a given token, which may be embedded in a digital image, can be redeemed multiple times but not necessarily by the same user.

Client-Side and Further Operations

In accordance with the above, a user device such as user device 105 can perform various operations. These operations may include receiving an instruction from a user to create a digital token to be associated with an image. This receiving operation can be performed by a software application on a smartphone, for example, along with receiving a selection of the image from the user. Thus a smartphone user could open an app on her phone and select a picture to have a digital token (e.g. representing an amount of money). Note that user-facing software to perform these and other operations below could be implemented in a variety of manners and a given action in the software could perform all or a portion of various operations described herein (likewise, in some cases, multiple actions in the software might be needed to accomplish one or more of the techniques described in this section and elsewhere).

Client side operations can also include authenticating an electronic payment account of the user based on authentication information provided by the user. A PayPal™ user might be authenticated using a fingerprint or PIN entry on a smartphone, for example. (Again, note that client-side operations are not limited to a smartphone but can be performed on any suitable device). Client-side operations can further include receiving a selection of a monetary amount to be debited from the electronic payment account in connection with creation of the digital token. A user could indicate that an image should have $25.00 added to it in the form of a token, for example, and this amount could be debited from a PayPal™ account balance, a credit or debit card, or another funding source.

Note that currency conversion can be performed in various instances. A U.S. based user could ask that a token for an image be created with 20 Euro, or 15 British Pounds. A funding source in one currency can thus be used to create an image token in a different currency. In some embodiments, an image token can be redeemed in a different currency than a currency in which it is based (e.g. a $20 U.S. token could be redeemed for an equivalent converted amount of Euro depending on location and/or settings of the redeeming user.) In some cases currency conversion fees could be assessed as well.

In some embodiments involving redemption of a digital token for an image, parsing operations may be performed on the client side (which may be particularly useful in limited bandwidth situations where sending an entire image to a receiving server might be inefficient or costly). Thus, instead of sending an image to image processing system 120, user device 105 could extract a token from the image locally, and then simply send the token to image processing system 120 for verification and redemption.

In another embodiment, client side operations include based on the authenticating of a user, transmitting a request to a remote computer system to create the embedded digital token, the request including the selection of the monetary amount. Thus, a smartphone device might send a request to PayPal™ requesting that a digital token be created for a particular image. Client side operations can also include receiving information indicating a digital token has been embedded in an image (e.g., information originating from image processing system 120 that embedding has been successful and/or information originating from local software running on a user device, in the event that embedding of the digital token is performed locally for example). Thus, in some cases, operations described herein with respect to embedding a digital token could be performed locally by a user device. The user device, in association with locally embedding a token, might receive token information such as a token identifier from image processing system 120 and/or could create token information locally depending on the token identification scheme that is used.

In another embodiment, client side operations can include responsive to a user selection of a recipient for an image, causing the image to be transmitted to the recipient. This could involve a smartphone device directly transmitting the image via a phone network using an MMS text message, transmitting the image via email, sending the image using a social media platform, etc. In some cases, this operation can involve causing image processing system 120 to send the image to a recipient as well (e.g. user device 105 need not transmit the image itself, in some instances).

Note that generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript. Note that as used herein, the term "computer-readable medium" refers to a non-transitory computer readable medium.

Computer System

Figure 6:
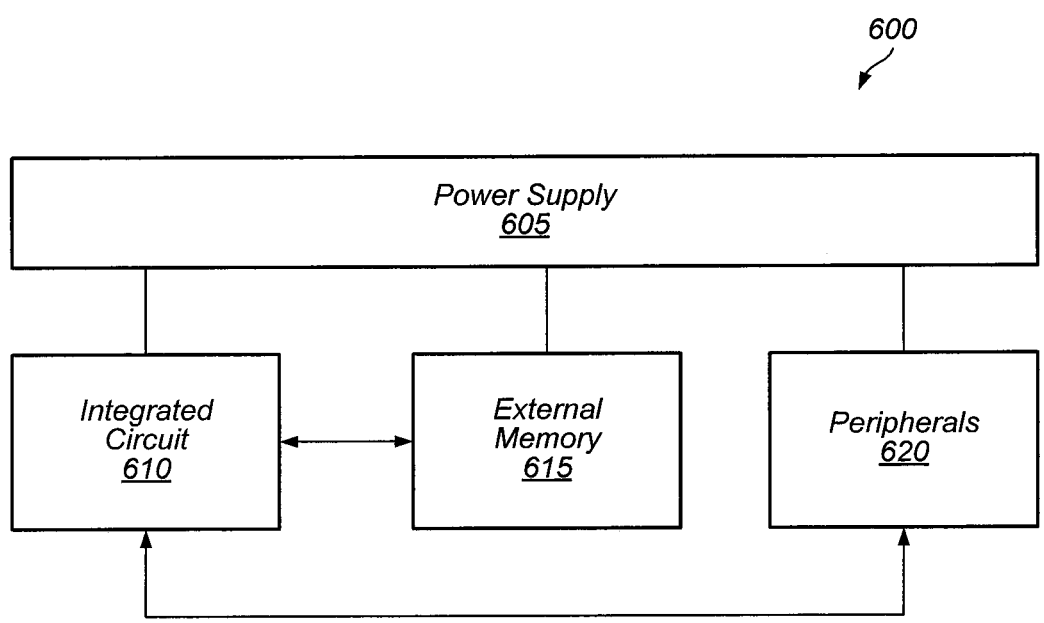
FIG. 6 is a block diagram of a system, according to some embodiments.

In FIG. 6, one embodiment of a computer system 600 is illustrated. Various embodiments of this system may be user device 105, image processing system 110, transaction system 160, or any other computer system as discussed above and herein.

In the illustrated embodiment, system 600 includes at least one instance of an integrated circuit (processor) 610 coupled to an external memory 615. The external memory 615 may form a main memory subsystem in one embodiment. The integrated circuit 610 is coupled to one or more peripherals 620 and the external memory 615. A power supply 605 is also provided which supplies one or more supply voltages to the integrated circuit 610 as well as one or more supply voltages to the memory 615 and/or the peripherals 620. In some embodiments, more than one instance of the integrated circuit 610 may be included (and more than one external memory 615 may be included as well).

The memory 615 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 610 in a chip-on-chip configuration, a package-on-package configuration, or a multi-chip module configuration.

The peripherals 620 may include any desired circuitry, depending on the type of system 600. For example, in one embodiment, the system 600 may be a mobile device (e.g. personal digital assistant (PDA), smart phone, etc.) and the peripherals 620 may include devices for various types of wireless communication, such as wifi, Bluetooth, cellular, global positioning system, etc. Peripherals 620 may include one or more network access cards. The peripherals 620 may also include additional storage, including RAM storage, solid state storage, or disk storage. The peripherals 620 may include user interface devices such as a display screen, including touch display screens or multitouch display screens, keyboard or other input devices, microphones, speakers, etc. In other embodiments, the system 600 may be any type of computing system (e.g. desktop personal computer, server, laptop, workstation, net top etc.). Peripherals 620 may thus include any networking or communication devices necessary to interface two computer systems.

Note that the terms "currency" or "money" are used in various locations in this disclosure relative to digital tokens that can be embedded in images. As noted above, in some embodiments, it is possible to embed other digital representations of quantified units having a real-world value (such as gift card amounts/merchant credits, frequent flyer points, credit card reward points, etc.). Thus, examples described relative to "currency" or "money" are not limited to these items only.

Further, note that digital tokens are described in various locations as being encrypted, and/or as being embedded in an image. A digital token does not have to be encrypted to be embedded in an image, but encrypting the digital token prior to embedding may enhance security. Additionally, an "encrypted" digital token may refer to a digital token that is wholly or partially encrypted, unless otherwise indicated. Further, as noted above, a digital token can be embedded in an image, in some embodiments, by storing image data (e.g. a hash or other uniquely identifying data) in a central repository (e.g. a database associated with image processing system 120) without any need to actually modify data in the image (such as pixel data or metadata).

Video Digital Token Embedding

Figure 7:
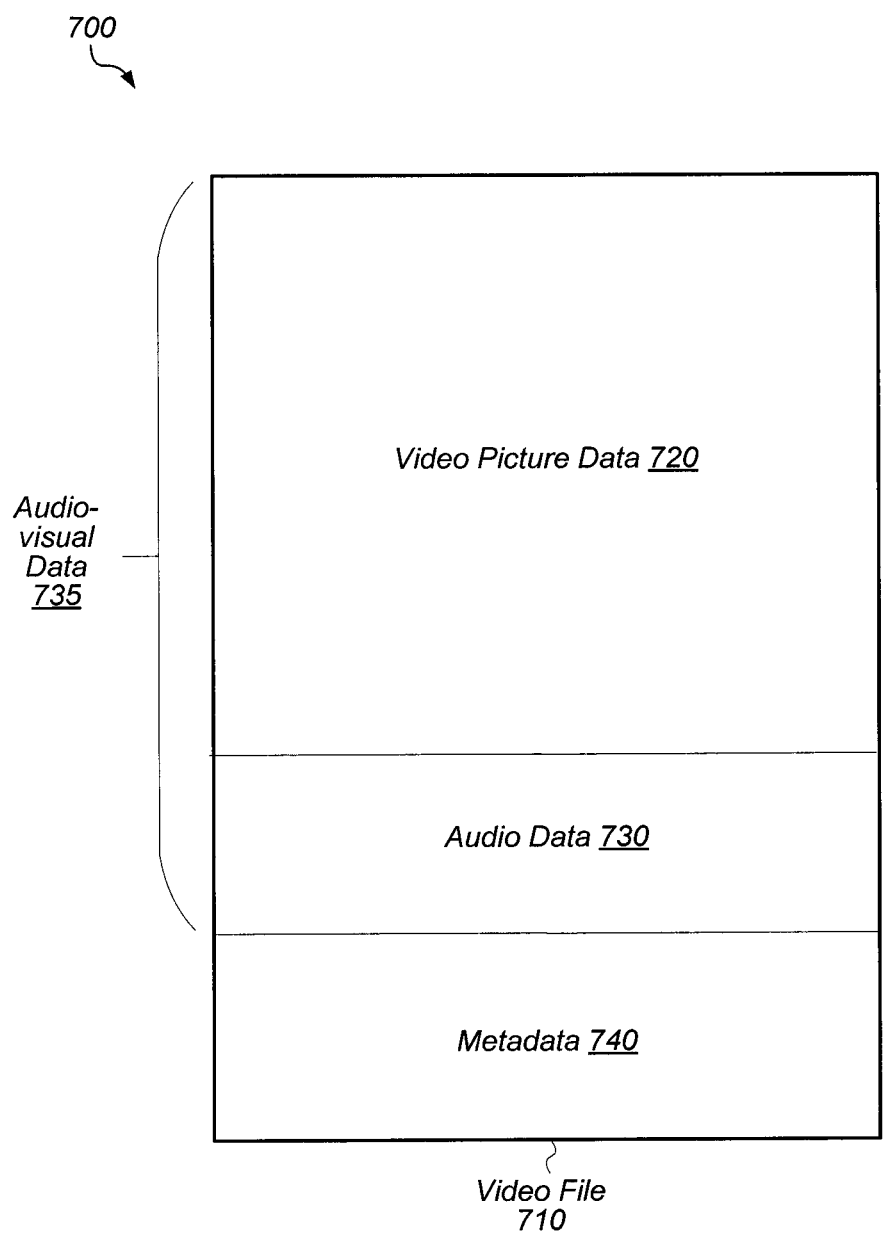
FIG. 7 is a block diagram of a video file, according to some embodiments.

Turning now to FIG. 7, a block diagram 700 is shown of a video file 710, according to various embodiments. Video file 710 may include data usable to play a video in a variety of digital video formats (e.g. MPEG-4, AVI, Quicktime™, etc.).

Video file 710 may include video picture data 720, audio data 730, and metadata 740. Video picture data 720 can include all information needed to render and play a series of video frames on a viewing device. Audio data 730 can likewise include all information needed to play audio accompanying a video file.

Metadata 740 can include various video related data that is not necessarily needed to be able to render the video and/or play its audio. Metadata 740 may contain GPS coordinates or other location information corresponding to a place associated with a video (e.g. a real world location where a video was shot). Metadata 740 may include a date and/or time that a video was taken. Metadata 740 can also include other data in various embodiments—for example, identities of people in the video, as may correspond to social media websites such as Facebook™.

Note that while depicted to be logically separate in FIG. 7, video picture data 720, audio data 730, and metadata 740 could be co-mingled within a file in various embodiments. That is, video picture data 720, audio data 730, metadata 740 need not be separate and contiguous in storage space—this data can be organized in any way that is desired and/or that conforms to a digital video format. In some embodiments, all or a portion of metadata 740 may even be stored in a separate file or other data. Audiovisual data 735, in various embodiments, includes one or both of video picture data 720 and audio data 730.

Figure 8:
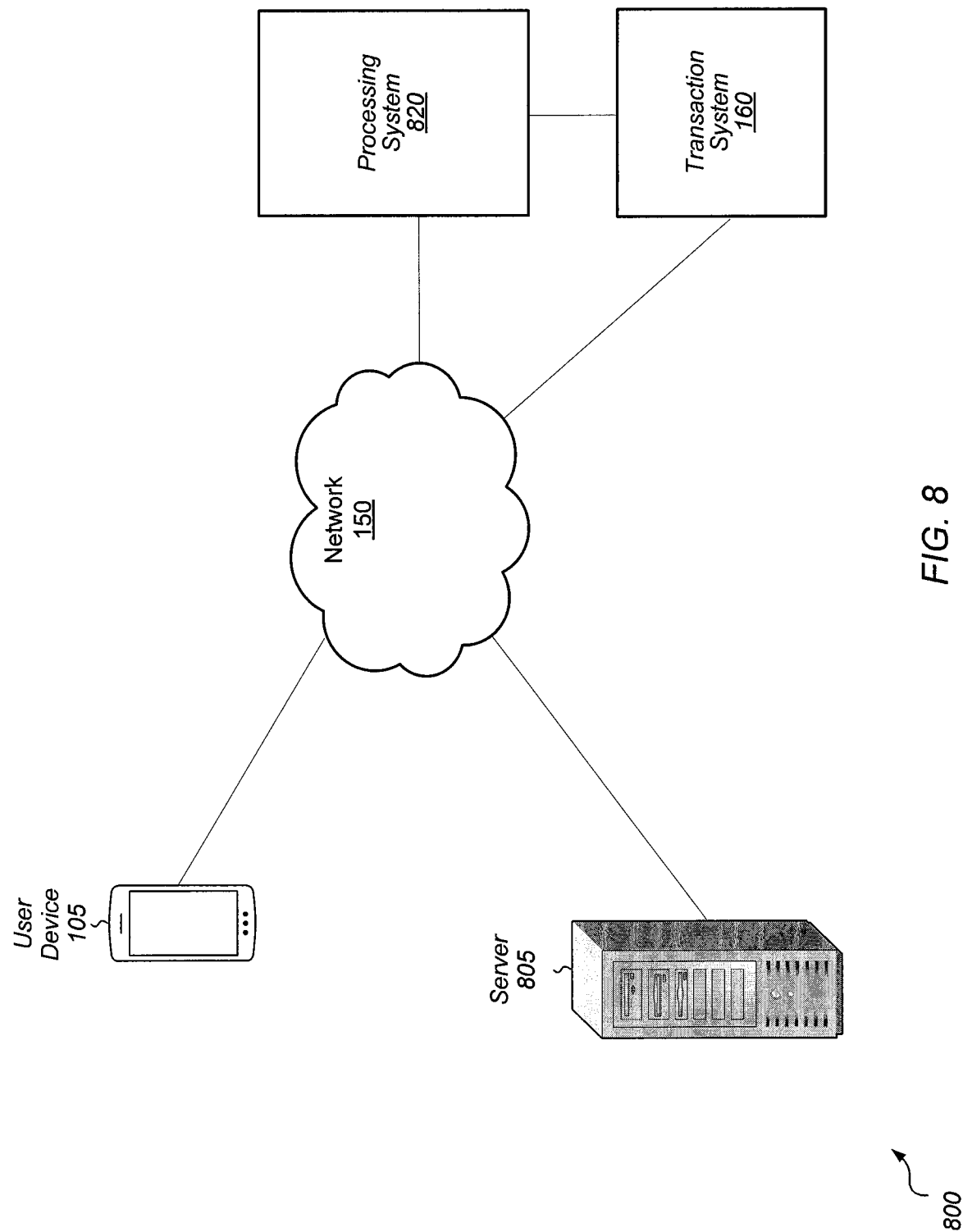
FIG. 8 is a block diagram of a system relating to various additional embodiments.

Turning now to FIG. 8, a block diagram is shown of a system 800 that relates to various additional embodiments. This diagram includes user device 105, server 805, processing system 820, and transaction system 160, connected via network 150. Server 805 may be a web server and/or a file server in various embodiments. Server 805 may store and/or provide videos, and may correspond to a media sharing platform (e.g. a service such as YouTube.Com™), a social media platform, or an advertising service, in various embodiments. Processing system 820 may be under the control of an electronic transaction service provider (who may also control transaction system 160), and can take various operations related to embedded digital tokens in video files.

Figure 9:
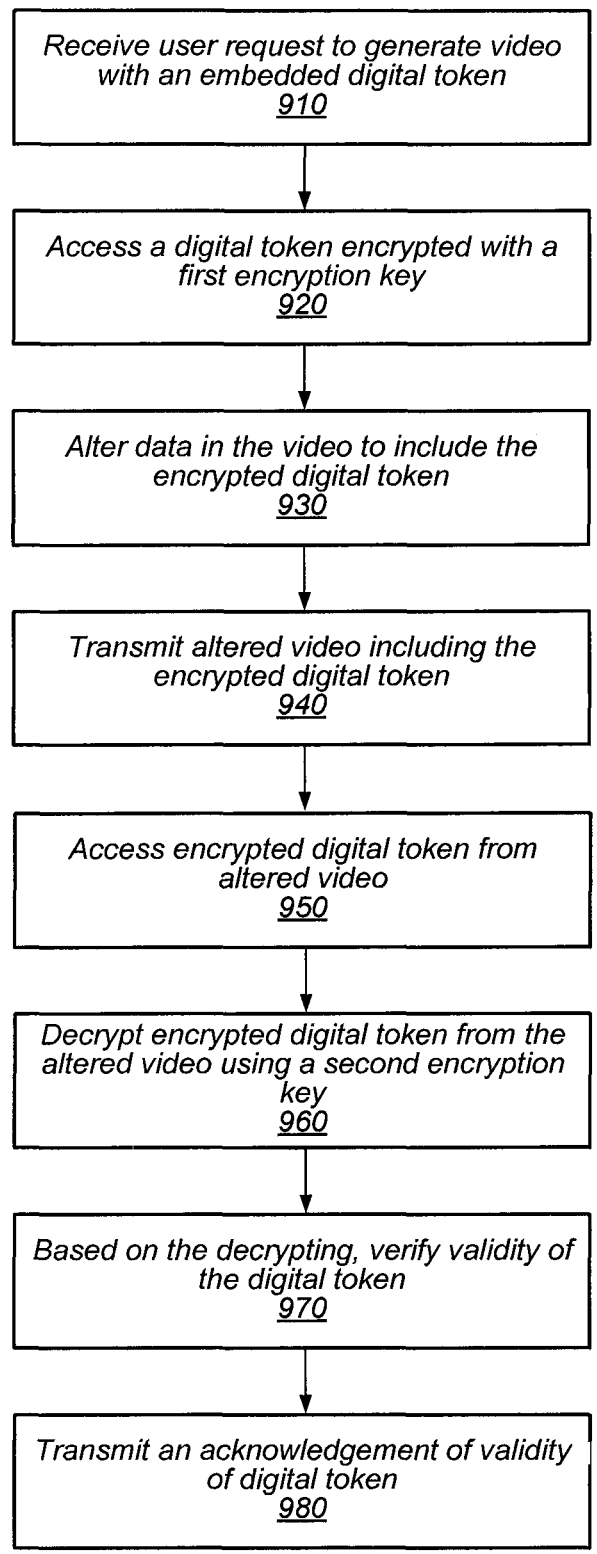
FIG. 9 illustrating a flow diagram of a method that relates to generating an altered video with an embedded digital token, according to various embodiments.

Turning to FIG. 9, a flow diagram is shown illustrating a method 900 that relates to generating a video with an embedded digital token, according to various embodiments.

Operations described relative to FIG. 9 may be performed, in various embodiments, by any suitable computer system and/or combination of computer systems, including processing system 820, user device 105, server device 805, and/or transaction system 160. For convenience and ease of explanation, however, operations described below will be discussed relative to processing system 820. However, in various embodiments, the described operations may be performed by another system (specifically including the devices listed above). Further, various elements of operations discussed below may be modified, omitted, and/or used in a different manner or different order than that shown.

In operation 910, processing system 820 receives a user request to generate a video with an embedded digital token, according to some embodiments. This request may be received from a user device (e.g. user devices 105, 110, or 115), for example. The request may be received from any other device, however, including server device 805 and/or processing system 820 itself.

The request in operation 910 may include or be accompanied by a video file to be used for embedding of a digital token. The request may also include or be accompanied by a network identifier specifying a location of the video (e.g. a URL).

The embedded digital token is a payment token, in various embodiments, corresponding to a desire of a user to have a video itself be able to serve as a representation of money. A user can use an application on a smartphone, such as the PayPal™ app or the Venmo™ app (or another app) to make the request to generate a video with an embedded digital token (e.g., a payment token). Such requests can of course originate from another computing device, such as a desktop or laptop computer, a wearable computing device, etc. A user may therefore take one or more actions on a computing device to cause the request to be received at processing system 820.

In some embodiments, a user can select the video in which he or she wishes to embed a digital token. Thus, a user of a smartphone may be able to browse through a library of captured videos on the phone to select one. In other embodiments, an app on a smartphone (or other device) may actually prompt the user to take a new video by causing a camera application on the smartphone to be opened up. Accordingly, in one embodiment, the request in operation 810 is received from an application running on a mobile phone device. A video uploaded by the user may also corresponds to a video originally created using a camera of a mobile phone device (or may be a video otherwise acquired by the user, on any device, in various embodiments). In some cases, server 805 may make the request to have a video generated with an embedded digital token as part of an advertisement or social media action. E.g., a business, promoter, etc., may request that the video be created.

In operation 920, processing system 820 accesses a digital token encrypted with a first encryption key, according to some embodiments. This digital token may be created by processing system 820, and may be generated using a charge to one or more funding sources—e.g., a credit card, checking account, existing PayPal™ account balance, etc. Operation 920 may be performed responsive to a user request (e.g., operation 920 can be performed in response to a user of a smartphone requesting to create a video with money embedded in the video).

In some embodiments, the device accessing the digital token in operation 920 did not create the token itself, however—for example, user device 105 or server 805 may request and receive the digital token from processing system 820. Thus, a computer system executing method 900 may transmit a token request to a remote system (e.g. from server 805 to processing system 820) and receive, from the remote system responsive to the token request, the encrypted digital token.

A token request (e.g. sent to processing system 820) may include user authentication credentials for an electronic payment transaction account. These credentials may include PayPal™ account credentials—e.g. login information and a password, a biometric, a previously stored authentication token on a device, etc. The token request may include a selection of a funding instrument associated with the electronic payment transaction account, such as a credit card, debit card, checking account, existing account balance, etc. The token request may also include an indication of an amount of currency to be charged to the funding instrument (e.g. the amount of currency to be embedded in the video).

The token request may also include an indication of whether the token will be embedded in metadata or audio-visual data of the video. For example, user device 105 or server 805 may provide in the token request an indication of a particular codec used to encode the video, where content of the encrypted digital token is created by a remote system based on the particular codec used to encode the video. The codec may be relevant in a variety of circumstances—a video encoded with AVI for example may need to have a different token format than a video encoded with MPEG-4. Some video encodings may allow for a digital token to be stored in metadata, for example, while others may not (this could depend on the amount of free space allocated in the metadata for a particular digital format for example). Also, if a token is to be stored within audiovisual data, the format of the token may again depend on the video encoding scheme. Some characters in the token may need to be avoided (e.g. control characters) to ensure the video does not become corrupted once the token is embedded for example.

In some cases, the user request in operation 920 may specify a video already uploaded to a media sharing platform. A user who has a video available on a website (which may be a social media platform), for example, may provide information usable to identify the location of the video to processing system 820 inside the token request. Processing system 820 can then access the video and embed a token inside it. In some instances, processing system 820 may further contact the website and have the website dynamically request replacement of the existing video with the altered video that contains the digital token. E.g., a YouTube™ or Snapchat™ video could be replaced with a new version of the previously posted video, except the new version would have the digital token embedded inside it. (This can be accomplished by contacting a website or server and providing user account credentials for that site or service, for example).

The information identifying the amount of digital currency, in some embodiments, can include a unique identifier created by processing system 820. Processing system 820 may maintain information for a large number of different videos with embedded digital tokens, each of which may be redeemable for an amount of digital currency. In order to be able to track the digital tokens (and to know how much money is associated with a particular token), processing system 820 therefore can use unique IDs for each token to access information associated with that token (e.g., monetary amount, creator of token, etc.). Note that various attribute information/metadata may be associated with a digital token that is embedded in a video. This information can be included at the time the digital token is created, or can be modified at a later time in some embodiments.

The encrypting performed in operation 920 may be done using a public-private key pair. In one embodiment, for example, operation 920 may include processing system 820 encrypting a digital token with the public key in a public-private key pair (preventing the encrypted digital token from being decrypted by someone who does not have the corresponding private key, which may be kept secret by processing system 820). In another embodiment, operation 920 may also include using the private key of a public-private key pair to add signature information into a video. For example, a private key for Venmo™ could be used to encrypt information saying "This video includes $5.00 in digital currency redeemable by Venmo™!" (or similar). Anyone with Venmo's public key could decrypt the signature information and would then know that Venmo legitimately authorized placement of a currency-bearing digital token within a video, in this example In operation 930, processing system 820 alters data in a video to include an encrypted digital token, according to some embodiments. Operation 930, in some embodiments, includes altering data in a video to include an encrypted digital token in order to create an altered video that includes the encrypted digital token. In other words, an encrypted digital token may be stored within an altered video (either in metadata and/or within audiovisual data). Operation 930 includes altering video metadata 740 and/or audiovisual data 735 in various embodiments. (Note that altering audiovisual data may include altering one or both of video picture data 720 and audio data 730—and generally, any operation described regarding audiovisual data 735 can thus including altering one or both of video picture data 720 and audio data 730.

Altering data in a video to include an encrypted digital token (e.g. representing an amount of digital currency) therefore can be performed in different manners. In some cases, altering video metadata 740 may result in a completely unchanged digital video. In other cases, altering audiovisual data 735 can result in a changed digital video— however, these changes may be very slight such that a user's visual perception of the altered digital video is similar or the same to their perception of the un-altered video prior to embedding of the encrypted digital token. Altering data in the video therefore can include altering metadata and/or altering audiovisual data.

Operation 930 may include embedding a digital token within a single frame of a video, or within multiple frames of the video. In some instances, "frames" may not be explicitly delineated by the video encoding algorithm and the token may simply be embedded within one or more various portions audiovisual data 735. The token can even be included (or made to appear) in multiple locations—for example, the audiovisual data could be altered to show a visual indicator of the token at the 5 minute mark, 10 minute mark, and 25 minute mark. Thus, altering the video for the embedded digital token can cause a perceptible visual shift in an appearance of the video. Audio content may also be altered to reflect the presence of the digital token (e.g. a noise or speech could be included at the 30 second and 60 second mark of a video). In some cases, the altered content itself may be used to encode the actual digital token (e.g. the modified bits of the audiovisual content that give rise to the perceptible change in the video actually contain all or a portion the digital token itself). In other cases, the alteration to the content may not contain the digital token (e.g. it could be stored in metadata), but the alteration to the media content can help alert a user to the presence of the digital token.

In operation 940, processing system 820 transmits an altered video including an encrypted digital token, according to some embodiments. The transmitting can be to any computer system.

This operation may include transmitting an altered video that represents an amount of digital currency, for example, to a user different from the first user. This could be for a gift, for a payment, or any other monetary transfer that the user wishes to complete via a video. In one embodiment, however, the altered video could be transmitted to the same user (e.g. the user receives the altered video with the encrypted digital token from processing system 820, and can then do something with it such as email it, post to social media or filesharing platform, save for later usage, etc.).

The transmitting in operation 940 can therefore include a transmission to a device and/or a user account. Transmitting can be accomplished by an upload to a social media platform (e.g., a direct message on TWITTER™, a video posted on INSTAGRAM™ or FACEBOOK™, etc.). Transmitting in operation 940 can include sending an email to a user email address, or a multimedia text message directed to a phone number (e.g. an MMS message) which may ultimately be received by a smartphone, for example, in various embodiments. A video with an encrypted digital token, once initially created and/or transmitted, can also be transferred without restriction in various embodiments (e.g. a first user can send the video to a different second user, who can then send the video on to anyone of their choosing).

In one embodiment, however, operation 940 includes using a closed system to transmit an altered video with an embedded digital token. A user of VENMO™ (or another platform) for example, might be allowed to transmit an altered video only to other VENMO users, or only to users of one or more other particular platforms. E.g., video transmission may be restricted in some instances. For example, a client platform application might allow a user to view a video and transmit the video, but only within the platform application. If the user tried to extract the video, in one embodiment, the embedded digital token data would not carry forward with the extracted video. Thus a user can be prevented from unrestricted transmission in some cases.

Note that transmission, in operation 940, does not necessarily including transmitting an entire video file in some embodiments. The transmission can explicitly include sending a URL or other selectable download link to allow the receiving user to download/view the altered video containing the digital token.

In operation 950, processing system 820 accesses an encrypted digital token from an altered video, according to some embodiments. This may include processing system 820 receiving the altered video including an encrypted digital token. The altered video may be received from a second user (e.g. a user to which the video was previously transmitted) or any other user, in various embodiments. Thus, video with an embedded digital token representing an amount of money can be sent to one or more various users, and then received again (back) at processing system 820. After this later receipt, processing system 820 can determine if there is a valid token can should be redeemed for currency, as further discussed below.

Similarly to operation 840, processing system 820 can receive a video in a variety of ways in operation 850. A client application (e.g. a VENMO or VENMO-affiliated application running on a smartphone) could send the video, for example, responsive to a user action. A user could drag and drop or otherwise select the video to cause the client application to transmit the video back (e.g. for verification).

In some cases, various user software (e.g. on device 105) may recognize the presence of a digital payment token in some embodiments, and allow a user to take action to redeem it. For example, if a user is viewing a video with an embedded digital token, the viewing application could generate a graphical control interface (such as a pop-up button) allowing the user to redeem a digital token for currency (or another reward). Thus, a media viewer within a web browser or other application could alert the user when a digital token-bearing video is being viewed. The alert may be synchronized to one or more particular moments during playback of the video content (e.g. for one or more particular frames or times). These times may be specified in a user request for creating an altered video with an embedded digital token.

In operation 960, processing system 820 decrypts an encrypted digital token from an altered video using a second encryption key, according to some embodiments. As noted above, the altered video can be transmitted to processing system 820 for decryption by any user in possession of the altered video (or a URL or some other form of location pointer), in various embodiments. Operation 960 therefore can include using a second encryption key (such as a private encryption key in a public-private key pair) corresponding to a first encryption key (e.g. the public key) in order to perform decryption. After decryption, the embedded digital token can then be checked for validity and/or redeemed for currency, for example.

In some instances, operation 960 may require that processing system 820 be able to first extract the data from an altered video that should correspond to the embedded digital token. In other words, processing system 820 may need to know which data in the video file should be run through a decryption operation. This can be accomplished in some embodiments as long as processing system 820 knows what algorithm(s) and/or data were used to alter the video originally. E.g., processing system 820 may know to look at one or more certain video frames or segments of data to extract certain bits of information, or which portion(s) of video metadata contains embedded digital token data. Processing system 820 may have to reassemble an embedded digital token data prior to decryption (e.g. by appending different bits of extracted information and/or taking other operations, such as using bitwise arithmetic like addition, subtraction, or multiplication on certain bits of extracted information).

In operation 970, processing system 820 verifies the validity of a decrypted digital token, according to some embodiments. Verifying validity can include extracting a unique identifier from the decrypted digital token, and then querying a database with the unique identifier. The database may include a list of all digital tokens created by processing system 820, and a record for the unique identifier can be referenced in the database. This record can contain an indicator of whether or not a given token is valid or invalid, for example. The token may be marked invalid, for example, if it has been redeemed by a user and no longer has any monetary value. If there is no record for a unique token identifier, in some embodiments, this may indicate that the corresponding token is not currently valid. (Note that in some cases, it is possible that a decryption operation on the token, e.g. in operation 860, can fail on its own, which also indicates that a video has no valid encrypted digital token in various embodiments. This could occur if a video with a digital token became corrupted due to data errors or user interference, for example.)

After a digital token from a video is verified, a user who sent the digital token to processing system 820 for verification may be credited with an amount of currency corresponding to the digital token. Thus, if a user receives a video with a $50 encrypted digital token, the user may receive a $50 credit for an associated account (e.g. a Venmo or PayPal account) upon verification of the digital token and its redemption In operation 980, processing system 820 transmits an acknowledgement of validity of a digital token, according to some embodiments. In various embodiments, operation 980 is performed responsive to verifying the validity of a digital token (e.g. operation 970).

Thus, operation 980 may relate to sending an email, text message, or other communication that informs a user that a video (e.g. that has been accessed by processing system 820) contains a valid digital token. This acknowledgement may include information about an amount of currency, associated with the digital token, that is being credited to a redeeming user. Thus, for example, operation 980 might include sending a message that states "Congratulations! You have redeemed your selected video from (Sender) in the amount of $50!", or similar. As will be appreciated, a user can be informed of the successful validation of a digital token embedded in a video in a variety of ways.

In some embodiments, a user redeeming a video may not be automatically credited with an amount of currency upon successful validation of a digital token embedded in a video. A user may, in some instances, be presented with options for redeeming the currency amount for the digital token. For example, a user may be given the option to redeem the currency amount for an alternative award, such as frequent flyer miles, credit card points, a gift card to a merchant, etc. In some cases, the alternative award may have a bonus factor applied, e.g., a $50 currency amount might be redeemed for a $55 gift card for a merchant (a 10% bonus), or a greater amount of another type of (e.g. more than the normal cash equivalent for frequent flyer miles, etc.).

Further Video Embodiments

Thus, as described above, the method of FIG. 9 may allow a user to create an altered video with an encrypted digital token representing an amount of currency, in various embodiments. Additional aspects of these and related techniques are described below.

In some embodiments, a video-embedded digital token may have one or more restrictions placed on it. These restrictions may be specified by a user requesting creation of the altered video, for example, and/or by other parties. One such restriction is that the token can only be redeemed a limited number of times and/or by a limited number of people (who may be identified by email address or other unique identifier).

Platform-based restrictions may also be required. For example, an altered video could be posted to a social media platform such as Facebook™, with certain requirements. First, the digital token might be redeemable only by the first 50 users to attempt to redeem. Second, the digital token might specify that a user is required to "share" the video on the platform (Facebook™ in this example) with other users. Thus, external verification factors may be required in some instances in order for a token to be redeemed.

With external verification factor (a condition such as sharing the video to other users on a social media platform), an outside operator may have to verify that the external condition has been met. So, processing system 820 might receive a digital token redemption request and then have to see if the external condition is met. If a video is shared on a social media platform, for example, the platform operator could provide a cryptographically signed verification that the user has met the condition (e.g. Facebook™ could provide information stating that the user had met the condition for sharing the video). Of course, many different types of external redemption conditions are possible, and may vary by embodiment.

More broadly, various techniques discussed above (relative to FIGS. 1-6) as well as within U.S. application Ser. Nos. 15/721,437 and 15/609,941 are also applicable to video-related embodiments. Geo-location data can be used to determine whether an encrypted digital token in an altered video is redeemable. Other digital token controls can be used, such as expiration dates, identity and residency requirements, etc. Suitability/content controls can be used— videos might be restricted from having a digital token if they have nudity, violence, etc., as desired and specified.

When altering audiovisual data in a video to include a token, the algorithm/transformation used to store the data in particular locations may be used to reconstruct the token from the internal data within the video. E.g., a particular color value (#00FF02, in 256 bit RGB color) describing a small area of pixels for one or more video frames might be slightly altered to store a data value of "5" (changing to a barely perceptible value of #00FF07). The algorithm may then know to go to a certain spot in the video file, look for the "blue" value (07) and then subtract the original base value (02), resulting in the difference (05). Various such techniques can be used for storing the token. In some cases where a color value is used to refer to multiple locations within one or more image frames, an alteration algorithm may analyze the video to determine where the least visual impact would occur when inserting the digital token into the video (e.g. a color code affecting 10 pixels might be chosen in preference to a color code affecting the appearance of 85 pixels). Various client side operations can also be performed.

Digital incentive tokens (not just currency and other transferable quantities like frequent flyer reward points) can also be used as discussed in the '437 application. All feasible embodiments of that application can be adapted for use with video-embedded tokens and used under a variety of circumstances.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   receiving, at a computer system, a user request from a first user of a first computer system to generate a video with a digital token embedded in the video;
   transmitting, by the computer system, a token request to a remote system, wherein the token request includes an indication of whether the digital token will be embedded in metadata or audiovisual data;
   receiving, from the remote system responsive to the token request, the digital token encrypted with a first encryption key, wherein the encrypted digital token includes information identifying an amount of digital currency;
   determining, by the computer system, an alternative digital currency available for redeeming the amount of the digital currency;
   determining a bonus available for redeeming the amount of the alternative digital currency;
   altering, by the computer system, data in the video to include the encrypted digital token to create an altered video including the encrypted digital token;
   transmitting, by the computer system, the altered video including the encrypted digital token; and
   providing, by the computer system, an option to redeem one of the amount of the digital currency or the amount and the bonus of the alternative digital currency.

2. The method of claim 1, further comprising:
   generating, at the computer system, the digital token using a particular funding source.

3. The method of claim 1, further comprising:
   receiving, responsive to a user action at the computer system, the altered video including the encrypted digital token;
   decrypting, by the computer system using a second encryption key corresponding to the first encryption key, the encrypted digital token in the altered video that was received;
   based on the decrypting, verifying a validity of the digital token by the computer system; and
   responsive to verifying the validity of the digital token, transmitting, by the computer system, an acknowledgement of the validity of the digital token.

4. The method of claim 1, further comprising:
   receiving, at the computer system, a network resource indicator specifying a location of the altered video;
   accessing the altered video via the network resource indicator; and
   based on the accessing, determining a validity of the encrypted digital token in the altered video.

5. The method of claim 1, wherein the token request includes:
   user authentication credentials for an electronic payment transaction account;
   a selection of a funding instrument associated with the electronic payment transaction account; and
   an indication of an amount of currency to be charged to the funding instrument.

6. The method of claim 5, wherein the electronic payment transaction account has a plurality of funding instruments associated with it.

7. The method of claim 1, wherein the token request includes an indication of a particular codec used to encode the video; and
wherein content of the encrypted digital token is created by a remote system based on the particular codec used to encode the video.

8. The method of claim 1, wherein the user request is received from an application running on a mobile phone device, and wherein the video corresponds to a video originally created using a camera of the mobile phone device.

9. The method of claim 1, wherein the user request specifies a video already uploaded to a media sharing platform.

10. A non-transitory computer-readable medium having instructions stored thereon that are executable by a computer system to cause the computer system to perform operations comprising:
receiving, at a computer system, a user request from a first user of a first computer system to generate a video with a digital token embedded in the video;
transmitting, by the computer system, a token request to a remote system;
receiving, from the remote system responsive to the token request, the digital token encrypted with a first encryption key, wherein the encrypted digital token includes information identifying an amount of digital currency;
determining, by the computer system, an alternative digital currency available for redeeming the amount of the digital currency;
determining a bonus available for redeeming the amount of the alternative digital currency;
altering, by the computer system, data in the video to include the encrypted digital token to create an altered video including the encrypted digital token;
transmitting, by the computer system, the altered video including the encrypted digital token; and
providing, by the computer system, an option to redeem one of the amount of the digital currency or the amount and the bonus of the alternative digital currency.

11. The non-transitory computer-readable medium of claim 10,
wherein the altered video comprises the encrypted digital token embedded within a single frame of the video.

12. The non-transitory computer-readable medium of claim 10,
wherein the altered video comprises the encrypted digital token embedded within multiple frames of the video.

13. The non-transitory computer-readable medium of claim 10,
wherein altering the data in the video to include the encrypted digital token causes a perceptible alteration in at least one of audio content and video content of the video.

14. The non-transitory computer-readable medium of claim 13, wherein the perceptible alteration is synchronized to one or more particular times in the video specified by a user.

15. A system, comprising:
a processor; and
a non-transitory computer-readable storage medium having instructions stored thereon that are executable by the processor to cause the system to perform operations comprising:
receiving a user request from a first user of the system to generate a video with a digital token embedded in the video;
transmitting, by the system, a token request to a remote system, wherein the token request includes an indication of whether the digital token will be embedded in metadata or audiovisual data;
receiving, from the remote system responsive to the token request, the digital token encrypted with a first encryption key, wherein the encrypted digital token includes information identifying an amount of digital currency;
determining, by the system, an alternative digital currency available for redeeming the amount of the digital currency;
determining a bonus available for redeeming the amount of the alternative digital currency;
altering data in the video to include the encrypted digital token to create an altered video including the encrypted digital token;
transmitting the altered video including the encrypted digital token; and
providing, by the system, an option to redeem one of the amount of the digital currency or the amount and the bonus of the alternative digital currency.

16. The system of claim 15, wherein the operations further comprise:
specifying in the digital token a restriction on a redemption of the digital token.

17. The system of claim 16, wherein the restriction includes one or more of:
an identity based restriction, a sharing based restriction, or a limited number of redemptions restriction.

18. The system of claim 15, wherein the operations further comprise:
receiving, responsive to a user action, the altered video including the encrypted digital token;
decrypting, using a second encryption key corresponding to the first encryption key, the encrypted digital token in the altered video that was received;
based on the decrypting, verifying a validity of the digital token; and
responsive to verifying the validity of the digital token, transmitting an acknowledgement of the validity of the digital token.

19. The non-transitory computer-readable medium of claim 10, wherein the token request includes an indication of a particular codec used to encode the video; and
wherein content of the encrypted digital token is created by a remote system based on the particular codec used to encode the video.

20. The non-transitory computer-readable medium of claim 10, wherein the token request includes:
user authentication credentials for an electronic payment transaction account;
a selection of a funding instrument associated with the electronic payment transaction account; and
an indication of an amount of currency to be charged to the funding instrument.

* * * * *

UNITED STATES PATENT AND TRADEMARK OFFICE
CERTIFICATE OF CORRECTION

PATENT NO. : 10,893,306 B2
APPLICATION NO. : 15/855992
DATED : January 12, 2021
INVENTOR(S) : Braden Christopher Ericson et al.

Page 1 of 1

It is certified that error appears in the above-identified patent and that said Letters Patent is hereby corrected as shown below:

In the Specification

In Column 4, Line 38, changed "stenographic" to --steganographic--

In Column 6, Line 52, change "420" to --120--

Signed and Sealed this
First Day of June, 2021

Drew Hirshfeld
*Performing the Functions and Duties of the
Under Secretary of Commerce for Intellectual Property and
Director of the United States Patent and Trademark Office*